US011299019B2

(12) United States Patent
Veille et al.

(10) Patent No.: US 11,299,019 B2
(45) Date of Patent: Apr. 12, 2022

(54) DEVICE FOR GUIDING A SLIDING WINDOW, GLAZED VEHICLE DOOR EQUIPPED WITH SAID DEVICE, AND VEHICLE EQUIPPED WITH SUCH A DOOR

(71) Applicant: Cooper Standard France, Rennes (FR)

(72) Inventors: Jean-Marc Veille, Rennes (FR); Thierry Garino, Taillis (FR); Patrice Gras, Saint M'herve (FR)

(73) Assignee: Cooper Standard France

( * ) Notice: Subject to any disclaimer, the term of this patent is extended or adjusted under 35 U.S.C. 154(b) by 0 days.

(21) Appl. No.: 16/963,011

(22) PCT Filed: Jan. 15, 2019

(86) PCT No.: PCT/EP2019/050926
§ 371 (c)(1),
(2) Date: Jul. 17, 2020

(87) PCT Pub. No.: WO2019/141675
PCT Pub. Date: Jul. 25, 2019

(65) Prior Publication Data
US 2020/0338966 A1    Oct. 29, 2020

(30) Foreign Application Priority Data
Jan. 18, 2018   (FR) ........................... 1850406

(51) Int. Cl.
*B60J 5/04*    (2006.01)
*B60J 10/79*    (2016.01)
*B60J 1/17*    (2006.01)

(52) U.S. Cl.
CPC ............... *B60J 5/0402* (2013.01); *B60J 1/17* (2013.01); *B60J 10/79* (2016.02)

(58) Field of Classification Search
CPC ............. B60J 5/0402; B60J 10/79; B60J 1/17
See application file for complete search history.

(56) References Cited

U.S. PATENT DOCUMENTS 4,483,100 A * 11/1984 Blankenburg ........ E05F 11/426
                                                      49/352
4,581,851 A    4/1986 Warner
(Continued)

FOREIGN PATENT DOCUMENTS

DE         2952019 A1    6/1981
DE    102011014340 A1    9/2012
(Continued)

OTHER PUBLICATIONS

Machine translation of DE-102012001644-A1.*
(Continued)

*Primary Examiner* — Marcus Menezes
(74) *Attorney, Agent, or Firm* — Lerner, David, Littenberg, Krumholz & Mentlik, LLP

(57) ABSTRACT

The invention relates to a device for guiding a sliding window (28) in a door (2) of a motor vehicle, which comprises a guide rail (5) and at least one guide runner (4) secured to the inner face of said sliding window (28), said guide rail (5) being provided with a cylindrical longitudinal cavity (52), said guide runner (4) comprising at least one guide head (42) fitted in said cavity (52). Said guide runner (4) is rigid and the guide head (42) thereof comprises at least three flat parts (420) that extend radially from an axis (421) of the runner head, and said guide rail (5) surrounds said guide head (42) such that the free ends (422) of each flat part (420) of the guide head (42) bear permanently against the inner wall of said longitudinal cavity (52).

17 Claims, 8 Drawing Sheets

(56) References Cited

U.S. PATENT DOCUMENTS

Figure 1:
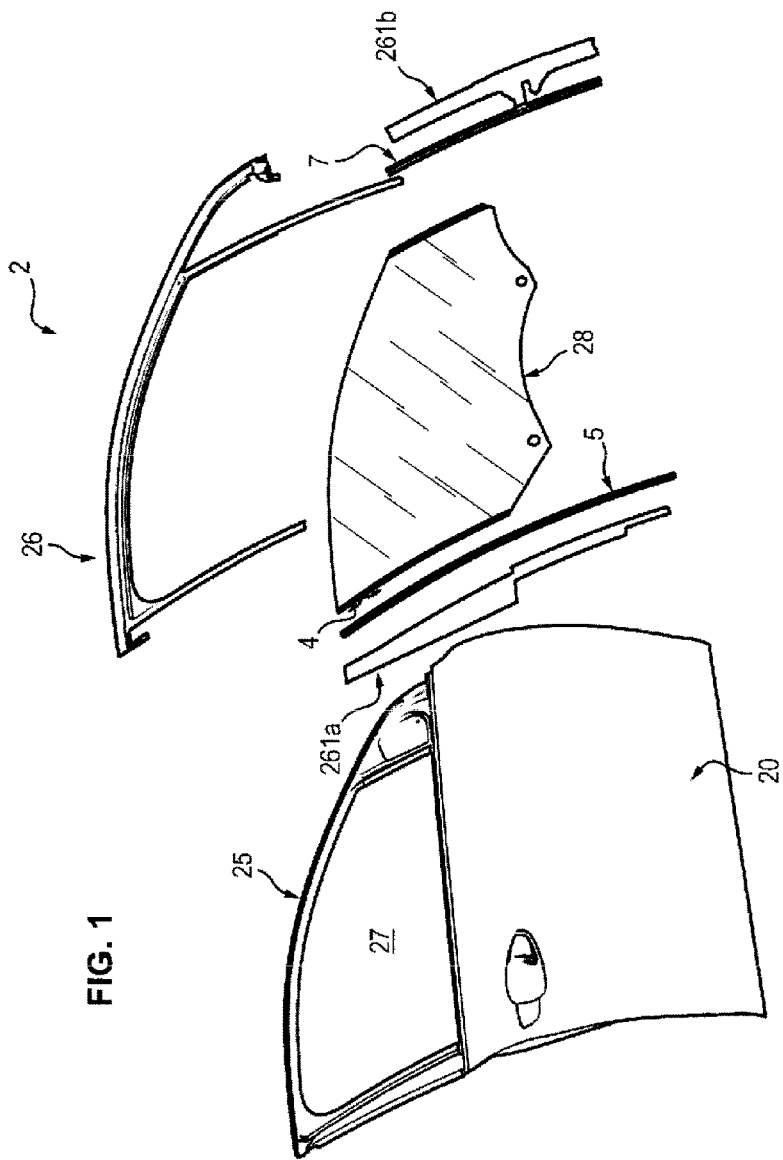

| | | | |
|---|---|---|---|
| 4,903,436 A * | 2/1990 | Rouillard | B60J 10/79 49/440 |
| 4,934,099 A * | 6/1990 | Maekawa | E05F 11/426 49/352 |
| 4,970,828 A | 11/1990 | Mesnel et al. | |
| 8,701,349 B2 | 4/2014 | Krause | |
| 2008/0209814 A1* | 9/2008 | Tarjeft | B60J 5/0402 49/415 |
| 2009/0309391 A1 | 12/2009 | Krause | |
| 2013/0061526 A1* | 3/2013 | Grudzinski | E06B 7/2307 49/258 |
| 2013/0061529 A1 | 3/2013 | Grudzinski et al. | |
| 2013/0061530 A1* | 3/2013 | Grudzinski | E05F 11/382 49/406 |
| 2017/0129318 A1* | 5/2017 | Uemura | B60J 5/0402 |
| 2018/0170154 A1* | 6/2018 | Charge | B60J 5/0402 |
| 2018/0186225 A1* | 7/2018 | Charge | B60J 10/88 |
| 2018/0312045 A1* | 11/2018 | Charge | B60J 5/0408 |
| 2019/0135089 A1 | 5/2019 | Roeder et al. | |
| 2020/0031213 A1* | 1/2020 | Charge | B60J 10/88 |
| 2020/0180405 A1* | 6/2020 | Blottiau | B60J 10/79 |

FOREIGN PATENT DOCUMENTS

| | | | | |
|---|---|---|---|---|
| DE | 102012001644 A1 * | 8/2013 | | B60J 1/17 |
| DE | 102012001644 A1 | 8/2013 | | |
| EP | 0376831 A1 | 7/1990 | | |
| EP | 2142394 B1 | 7/2011 | | |
| EP | 3183132 B1 | 5/2018 | | |
| EP | 3647093 A1 * | 5/2020 | | B60J 1/17 |
| FR | 2518025 A1 | 6/1983 | | |
| FR | 2535776 A1 | 5/1984 | | |
| FR | 3041905 A1 | 4/2017 | | |
| FR | 3076258 A1 | 7/2019 | | |
| WO | 2017157493 A1 | 9/2017 | | |
| WO | 2019093485 A1 | 5/2019 | | |
| WO | WO-2020021174 A1 * | 1/2020 | | B60J 1/17 |

OTHER PUBLICATIONS

International Search Report for Application No. PCT/EP2019/050926 dated Apr. 12, 2019, 2 pages.

Third Party Observation for PCT/EP2019/050926 submitted Oct. 11, 2019, 8 pages.

* cited by examiner

DEVICE FOR GUIDING A SLIDING WINDOW, GLAZED VEHICLE DOOR EQUIPPED WITH SAID DEVICE, AND VEHICLE EQUIPPED WITH SUCH A DOOR

CROSS-REFERENCE TO RELATED APPLICATIONS

The present application is a national phase entry under 35 U.S.C § 371 of International Application No. PCT/EP2019/050926 filed Jan. 15, 2019, which claims priority from French Application No. 1850406 filed Jan. 18, 2018, all of which are hereby incorporated herein by reference.

GENERAL TECHNICAL FIELD

The invention lies in the field of motor vehicles.

The present invention relates to a device for guiding a sliding window in a door of a motor vehicle, a glazed flush-window door of a motor vehicle equipped with such a device and finally, a vehicle comprising such a door.

PRIOR ART

In high-end vehicles, it is common for the doors not to have a frame forming a single part with the door around the window. Such doors are known as "frameless". When the door is closed and the window is in the closed up position, the window is flush with the level of the B-pillar.

In other vehicles, the door comprises a frame. However, to meet the desires of consumers, manufacturers and designers, the aesthetic appearance of this frame is designed to be as close as possible to the aesthetic of a "frameless" door. In this case, the window is mounted flush with respect to a surface-mounted part which is itself attached to one of the uprights of the frame.

Thus, from document FR 3 041 905 a glazed device is known, intended to be assembled with a motor vehicle door. This device comprises a glazed panel movable between a shutting position and at least one opening position and two guide rails for sliding said panel, these rails being mutually connected by an upper crossbar. The glazed panel bears, on its face oriented toward the inside of the vehicle, a guide shoe, mounted slidably inside said guide rail. These rails are made of plastic or aluminum but preferably of the latter material. The glazed panel of this door is flush, i.e. no element of the frame of the door surrounding this glazed panel projects toward the outside of the vehicle, with respect to the plane of this panel.

Such a guide rail is expensive, particularly when it is made of aluminum. In addition, this glazed device takes the form of a complete module to be assembled in a door and its mounting is different from a standard mounting. It may then be necessary to modify certain steps on the manufacturing line, which automotive manufacturers often wish to avoid.

There is also known from document U.S. Pat. No. 8,701,349 a device for guiding a sliding and flush window of a vehicle door. The guide shoe attached on the inner face of the window slides in a guide rail in contact with three sealing lips. However, these three lips may become deformed given their shape and the shape of the guide rail and do not guarantee the perfect guiding of the shoe, which may thus move along the longitudinal x-axis of the vehicle and along the transverse y-axis of the vehicle.

Finally, there is known from document US 2013/0061529 another guiding device wherein a shoe with an oval head slides in a guide rail with an oval recess with a certain clearance between them to avoid the blocking of the shoe. Hence, here again the shoe can move along the longitudinal x-axis of the vehicle and along the transverse y-axis of the vehicle.

OVERVIEW OF THE INVENTION

The invention has the aim of solving the aforementioned drawbacks of the prior art.

The invention in particular has the aim of proposing a technical solution making it possible to have a front or rear glazed door of a vehicle, equipped with a frame but having the visual appearance of a frameless door (i.e. with a window flush with the B-pillar) and which is less expensive and, easier to manufacture and install in any vehicle door than the devices of the prior art.

Another aim of the invention is to have a guiding device that makes it possible to improve the holding of the window along the longitudinal x-axis of the vehicle and along the transverse y-axis of the vehicle so that the window is always flush with the surface-mounted part attached to the upright of the door or very slightly out of flush, preferably less than 1 mm.

Such a device must also make it possible to obtain a good static determinacy (isostatism) of the window and simultaneously allow the guide rail to adapt to any curved shape of a door frame and to adapt to the dispersion and the manufacturing tolerances of a same door type.

Finally, the guiding device must not require the modifying of the frame of the door on which it is mounted, so that a car manufacturer can interchangeably mount the guiding device in accordance with the invention or another device on a given frame.

For this purpose, the invention relates to a device for guiding a sliding window in a glazed door with a flush window of a motor vehicle, comprising a panel extended by a frame, this frame and this panel together delimiting an opening inside which said window slides, this guiding device comprising a guide rail intended to be inserted and retained in one of the uprights of the frame of the door and at least one guide shoe intended to be attached to the inner face of said sliding window, said guide rail taking the form of a profile, provided with a cylindrical longitudinal recess opening onto a longitudinal slot, which extends the entire length of said rail, said guide shoe comprising at least one guiding head engaged in said longitudinal recess through said slot.

In accordance with the invention, said guide shoe is rigid, its guiding head comprises at least three, preferably four, flat parts extending radially from an axis named "axis of the shoe head", while being evenly distributed about the latter, and said guide rail is made of a flexible and elastically deformable elastomer material, which on the one hand surrounds said guiding head, so that the free ends of each flat part of the guiding head are constantly bearing against the inner wall of said longitudinal recess, so as to hold said guide shoe while permitting its axial sliding in said guide rail and which moreover allows the mounting of the rail on any curved part of said door frame.

Owing to these features of the invention, the guide rail adapts to the different curves of the upright of the door, while making it possible to hold the guide shoe on the longitudinal x-axis and transverse y-axis of the vehicle and to guide it. Furthermore, this rail is easy to produce and is then cut out and assembled in the uprights of the door. The door is therefore less expensive.

Finally, the flexibility of the seal favors the adjustment of its position in the upright of the door.

According to other advantageous and non-limiting features of the invention, taken alone or in combination:
- said guide rail is made of a rubber elastomer and/or thermoplastic elastomer material,
- said guide rail is made of a material chosen from among a graphite-based composite, a molybdenum disulfide-based composite, ethylene propylene diene monomer EPDM, polyacetal, polyamide, polytetrafluoroethylene PTFE, ultra-high-molecular-weight polyethylene, polypropylene or a polyolefin,
- said guide shoe is made of a thermoplastic elastomer material;
- said guide shoe is made of a material chosen from among a graphite-based composite, a molybdenum disulfide-based composite, polyacetal, polyamide, polytetrafluoroethylene PTFE, ultra-high-molecular-weight polyethylene, polypropylene or a polyolefin;
- the inner wall of the cylindrical recess of the guide rail is covered with an inner coating with a low frictional coefficient promoting sliding;
- the guide rail and its inner coating are co-extruded;
- the guide shoe comprises two guiding heads coaxial along said axis of the shoe head;
- each guiding head is of ovoid shape, the major axis of which corresponds to said shoe axis of the shoe head;
- the flat parts of one of the two guiding heads are angularly offset with respect to the flat parts of the other head;
- said guide rail comprises at least one member for attaching to the upright, such as a longitudinal tab extending the entire length of said guide rail, this member being shaped to be able to be received in a longitudinal groove of the upright of the door frame.

The invention also relates to a glazed door with a flush window of a motor vehicle, comprising a panel which is extended by a frame, this frame and this panel together delimiting an opening, said door also comprising a sliding window, movable between a closed position wherein it completely shuts said opening and an open position wherein it is at least partly engaged in said panel and at least partly clears said opening, said frame including two front and rear uprights mutually connected by a crossbar.

In accordance with the invention, this door comprises a device for guiding a window as mentioned above, said guide shoe is attached to the flush window of said door, the guide rail is mounted in one of said uprights so that said longitudinal slot opens in the direction of said opening and said rail and said shoe are dimensioned and positioned so that the window is flush; According to an embodiment, this is a front vehicle door and said guide rail is attached to the rear upright of the frame.

According to another embodiment, this is a rear vehicle door and said guide rail is attached to the front upright of the frame.

The invention also relates to a motor vehicle provided with at least one such glazed door.

OVERVIEW OF THE FIGURES

Other features and advantages of the invention will become apparent from the description that will now follow, with reference to the appended drawings, which show, by way of illustration but without limitation, possible embodiments thereof.

Figure 2:
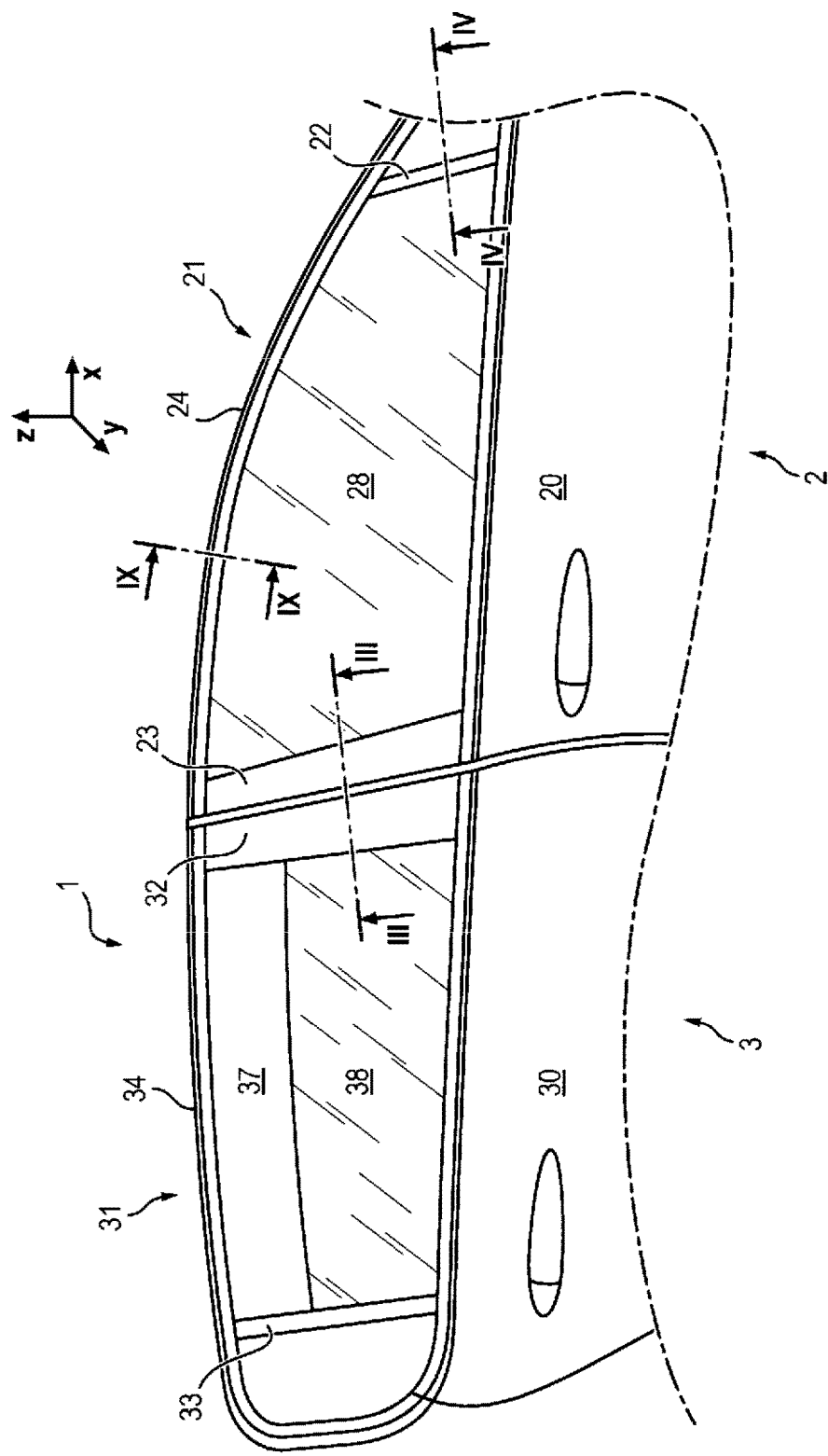
Figure 3:
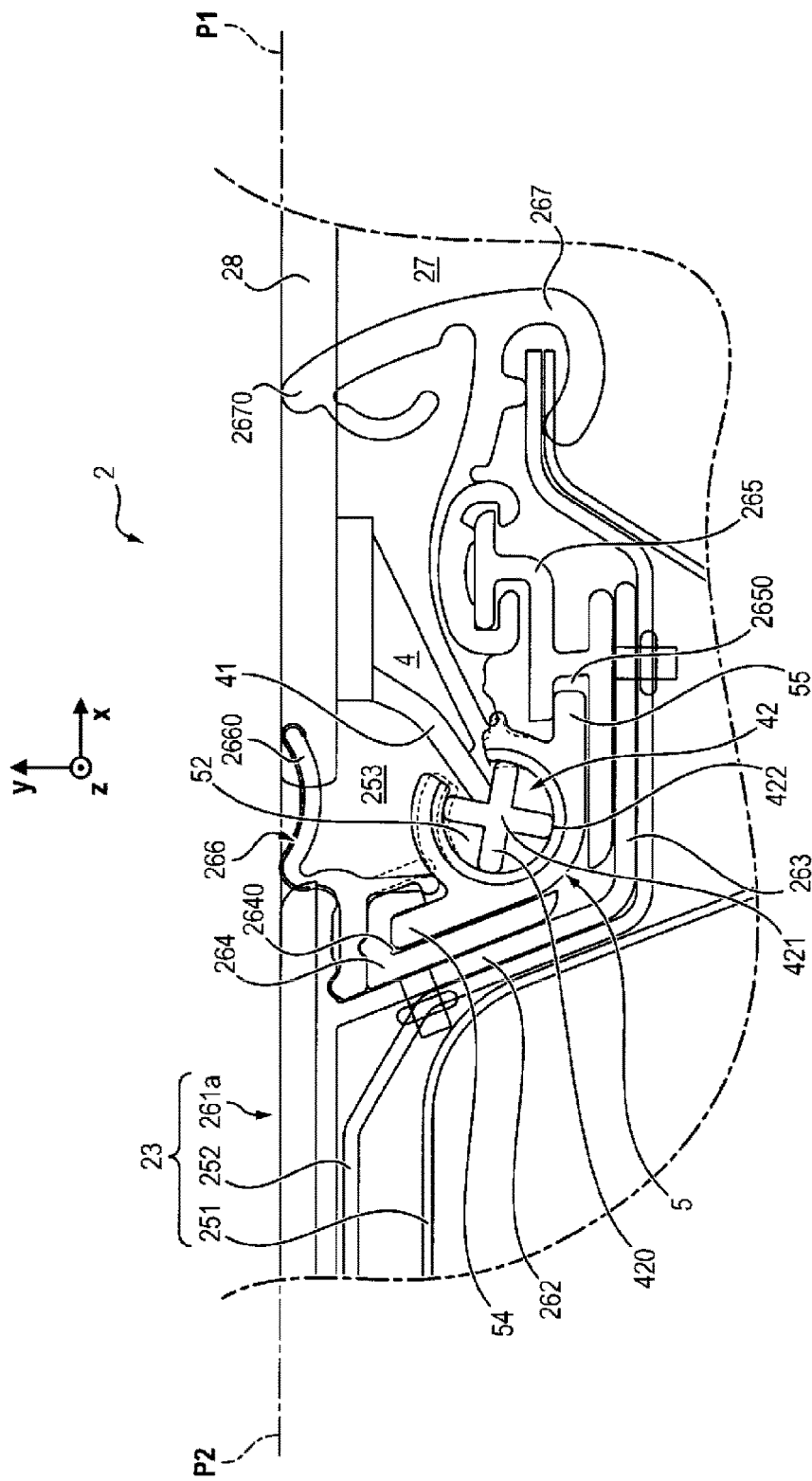
Figure 4:
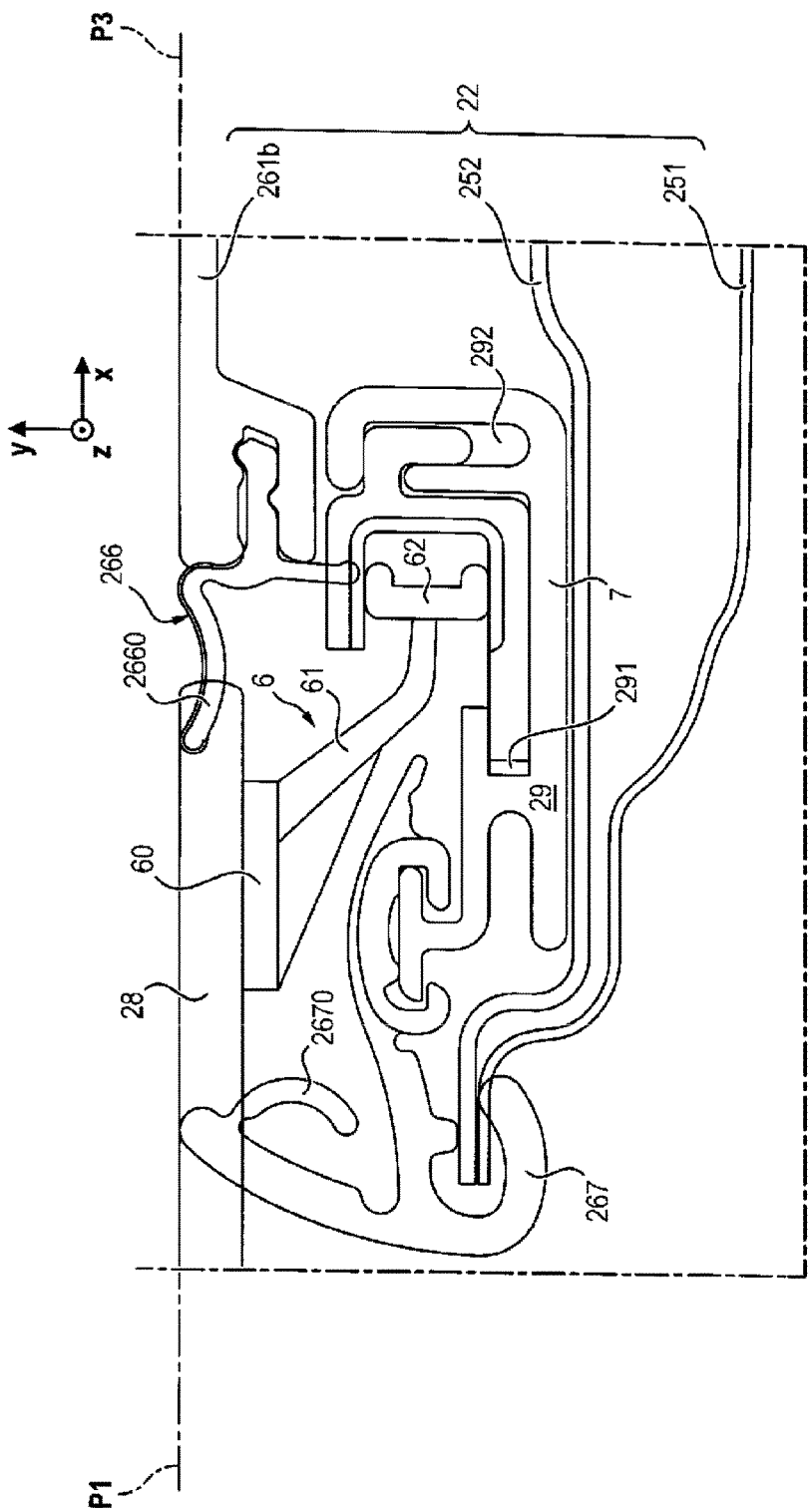
Figure 5:
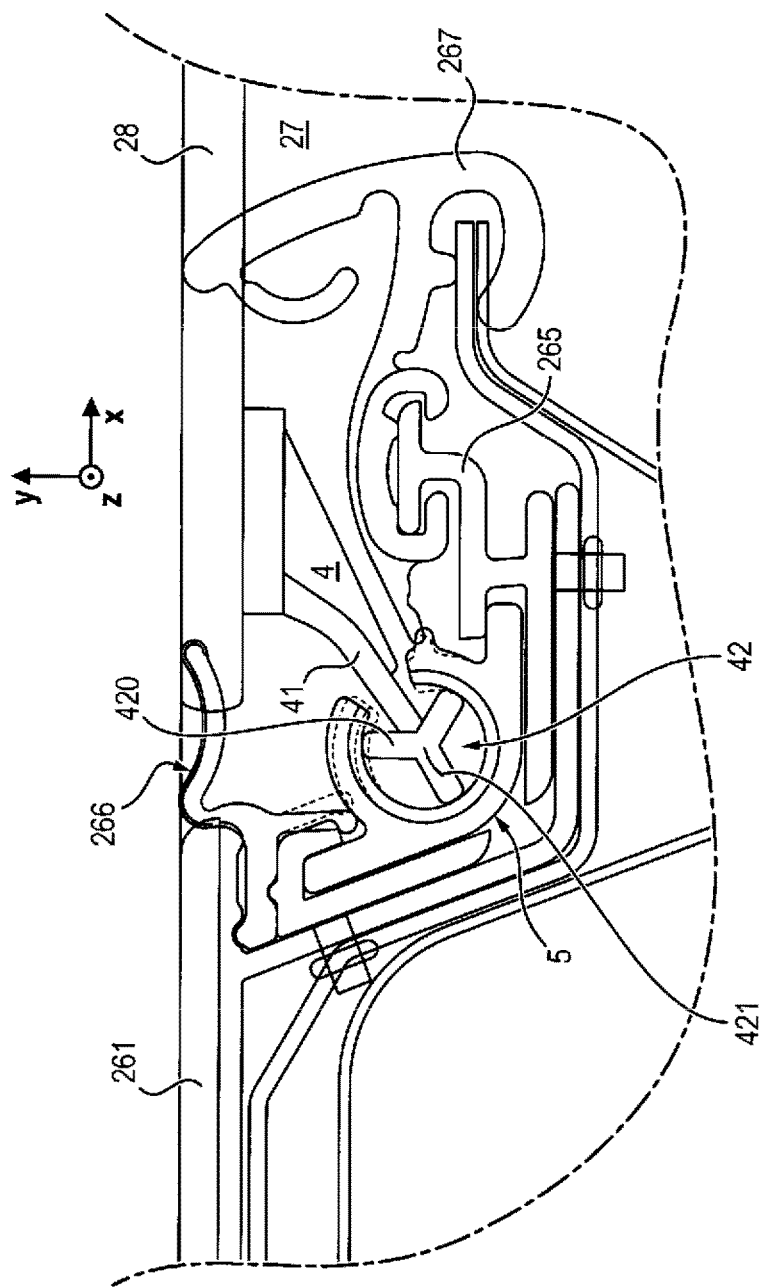
Figure 6:
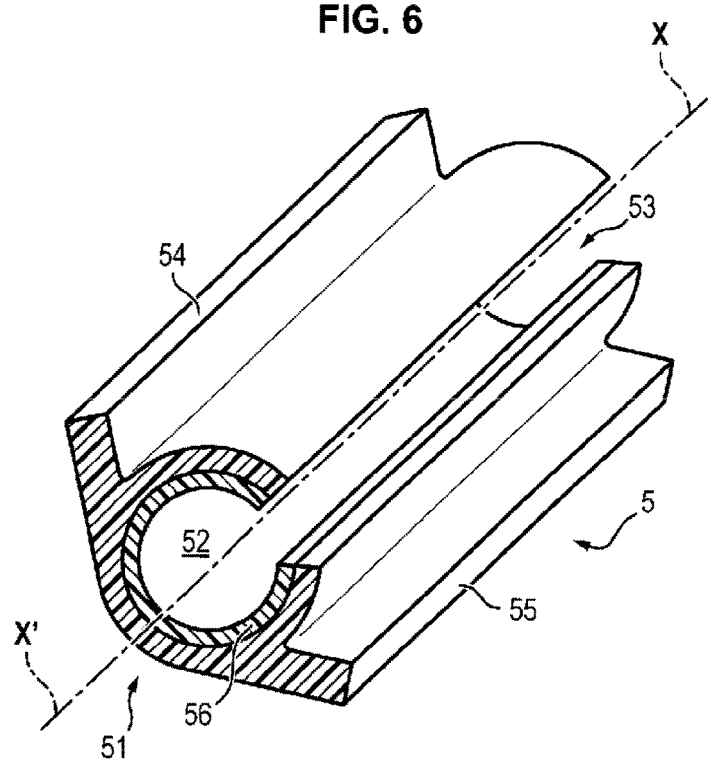
Figure 7:
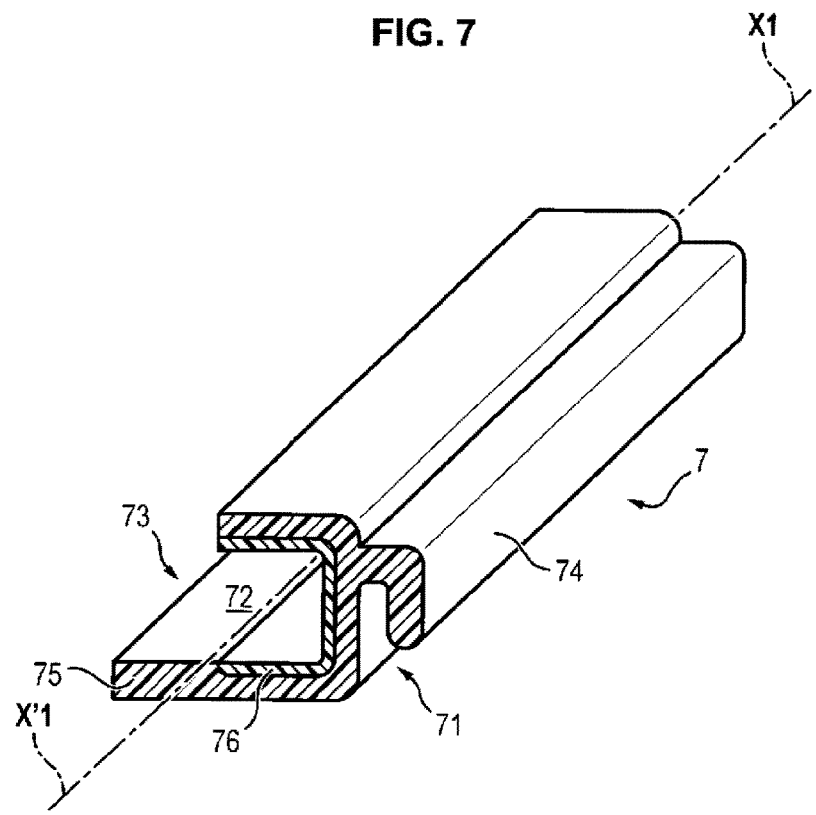
Figure 8A:
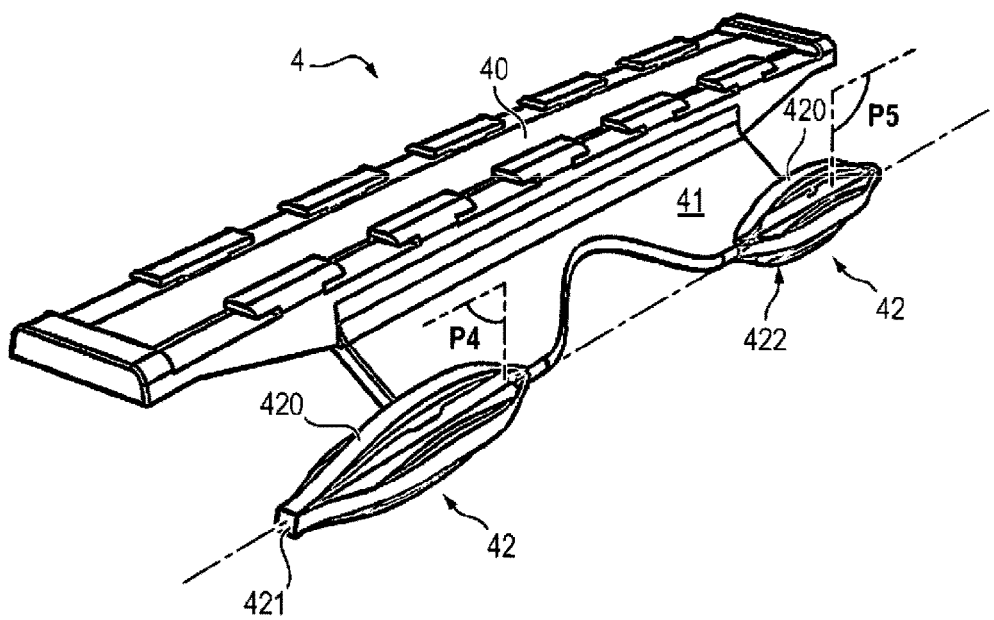
Figure 8B:
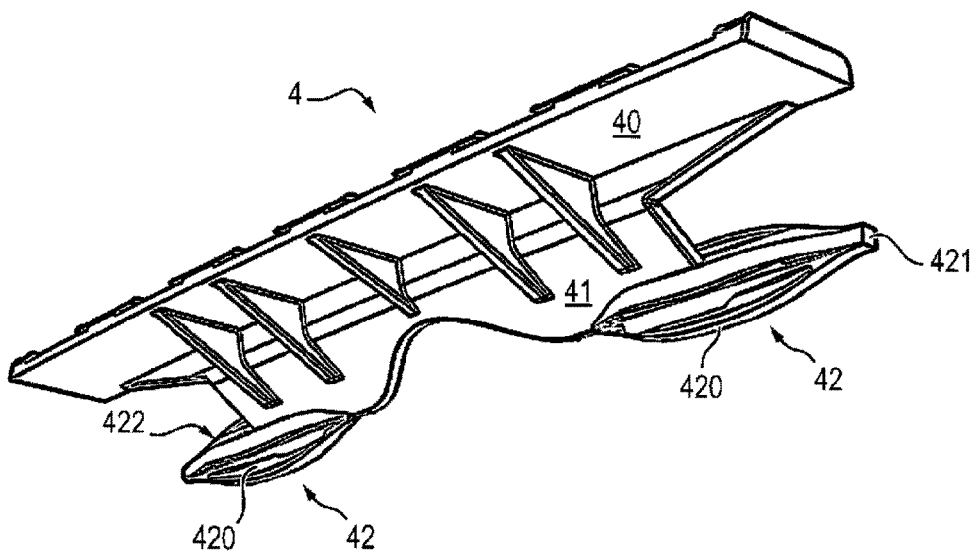
Figure 9:
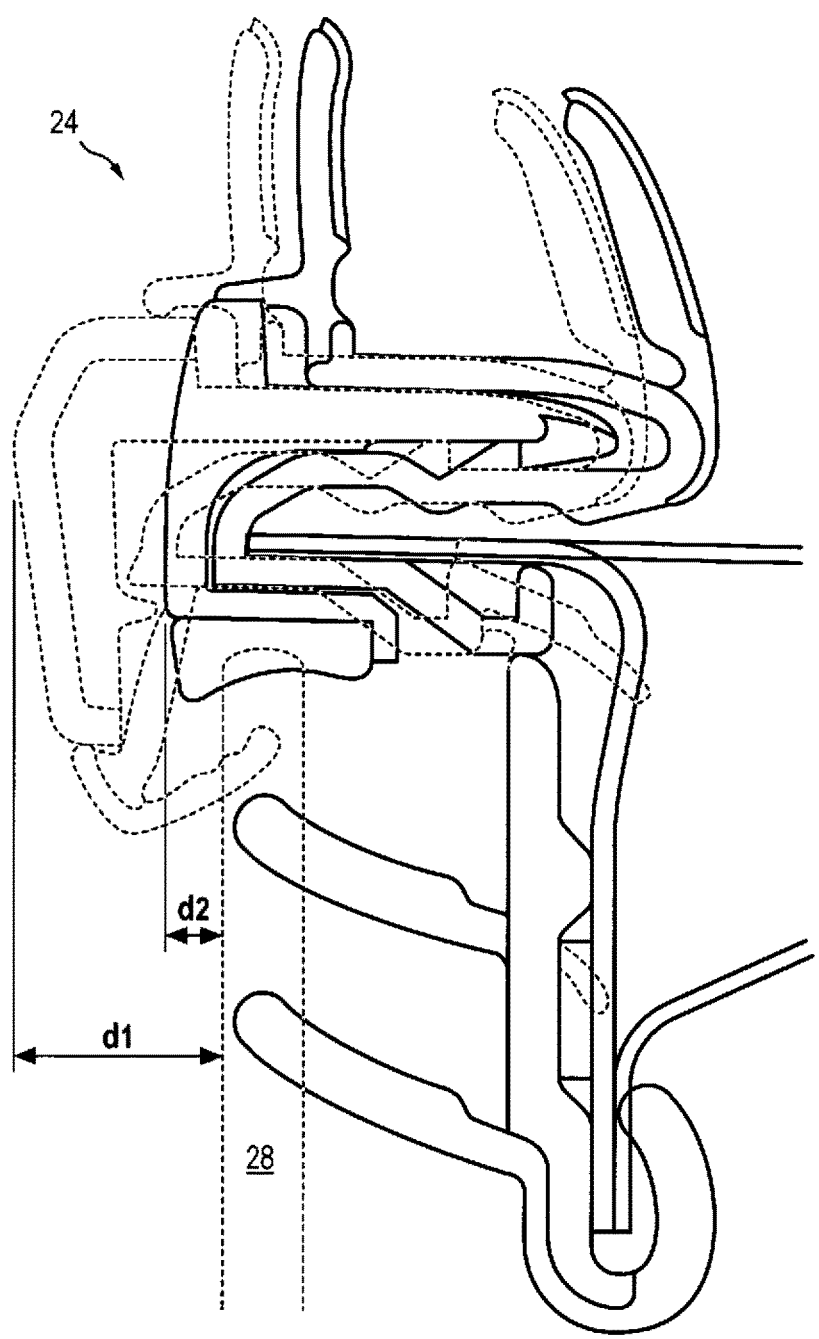

In these drawings:

FIG. 1 is an exploded schematic view of a vehicle door according to the invention, FIG. 2 is a side and outside view of a part of the front and rear doors of a vehicle in accordance with the invention, FIG. 3 is a cross-section view taken along the cutting plane passing through the line III-III of FIG. 2, FIG. 4 is a cross-section view taken along the cutting plane passing through the line IV-IV of FIG. 2, FIG. 5 is a cross-section view of a variant embodiment of the guide shoe of FIG. 3, FIGS. 6 and 7 are perspective views of parts of two guide rails in accordance with the invention, FIGS. 8A and 8B are perspective views along two different orientations of the guide shoe of the window of FIG. 3, and FIG. 9 is a cross-section view taken along the cutting plane passing through the line IX-IX of FIG. 2.

DETAILED DESCRIPTION OF THE INVENTION

With reference to FIG. 2, a lateral part of a vehicle 1 can be seen, comprising a front door 2 and a rear door 3.

The front door 2 comprises a panel (door box) 20, which is extended at its upper part by a frame 21.

This frame 21 comprises two uprights, namely a front upright 22 and a rear upright 23 (when one considers the direction of movement of the vehicle when driving forward), mutually connected by a crossbar 24. The two uprights 22 and 23 extend vertically or substantially vertically depending on the shape of the frame.

More precisely, and as can be seen in FIG. 1, the frame 21 is composed of a surround 25 made of sheet metal, which is a part of the bodywork welded to the panel 20, and of a surface-mounted part 26, attached onto the outer side of this surround 25.

The frame 21 delimits with the panel 20 an opening 27 which can only be seen in FIG. 1. The front door 2 also comprises a sliding window 28, movable between a closed position, in which it completely shuts the opening 27 and an open position.

In the closed position, its lower rim remains inserted into the thickness of the panel 20, while its upper rim comes into contact with a window seal, which is fixed to the crossbar 24.

In the open position, the window 28 is at least partly engaged in the panel 20 and at least partly clears the opening 27. There are therefore several open positions.

In a similar way, which will not be described in detail, the rear door 3 comprises a panel 30, a frame 31 comprising a front upright 32 and a rear upright 33, mutually connected by a crossbar 34. The frame 31 is also composed of a surround made of sheet metal onto which a surface-mounted part is attached, but these cannot be seen in the figures. The panel 30 and the frame 31 together delimit an opening 37. The rear door 3 also comprises a window 38.

With reference to FIG. 3, which represents a section along the line III-III of FIG. 2, the rear upright 23 and the window 28 of the front door 2 can be seen.

The rear upright 23 conventionally comprises a first so-called "inner" 251 structural profile, a second so-called "median" 252 structural profile which are part of the sheet metal surround 25 and a third profile 261a, the so-called "B-pillar trim", and which is part of the surface-mounted part 26.

The outside of the vehicle is found in the upper part of FIG. 3 and the inside of the passenger compartment in the lower part of this same figure.

The structural profiles 251 and 252 have a part incurvated toward the inside of the passenger compartment, so as to fashion between the window 28 and these incurvated parts a space 253 that serves to receive the means for guiding the window which will be subsequently described.

The surface-mounted part 261a is extended by a flank that comprises a so-called "transverse" part 262, since it is oriented in the direction of the inside of the vehicle and which extends by a so-called "longitudinal" part 263, since it extends substantially parallel to the longitudinal axis of the vehicle.

A first support profile 264 is attached to the transverse part 262 of the flank of the surface-mounted part, for example by screwing. This first support profile 264 has a longitudinal groove 2640, which preferably extends over the entire height of the rear upright.

A second support profile 265 is attached to the longitudinal part 263 of the flank of the surface-mounted part. It has a longitudinal groove 2650 which preferably also extends over the entire height of the rear upright 212.

The groove 2640 opens in the direction of the inside of the passenger compartment and the groove 2650 opens in the direction of the rear of the passenger compartment.

A first window seal 266 is attached between the front end of the surface-mounted part 261a and the first support profile 264. This seal 266 takes the form of a continuous strip and comprises a longitudinal lip 2660 which bears in an airtight manner on the vertical edge of the window 28.

A second window seal 267 is attached to the front end of the structural profiles 251 and 252. It takes the form of a continuous strip and comprises a lip 2670 intended to slide against the inner face of the window 28.

At least one guide shoe 4 is attached to the inner face of the window 28.

An exemplary embodiment of this guide shoe 4 is shown in FIGS. 8A and 8B. The shoe 4 comprises a bearing plate 40 intended to be attached, preferably by bonding, to the inner face of the window 28. This plate 40 is extended on its rear face (oriented toward the inside of the passenger compartment) by a pillar 41, then by at least one head, preferably two heads 42. Preferably, the head 42 has an arched shape (ogive shape) and has a cross-section in the shape of a cross, as can be seen more clearly in FIG. 3.

This guide shoe 4 is made of a rigid material, preferably of a thermoplastic elastomer material. By way of example, this material can be chosen from among a graphite-based composite, a molybdenum disulfide-based composite, polyacetal, polyamide, polytetrafluoroethylene PTFE, ultra-high-molecular-weight polyethylene, polypropylene or a polyolefin. These materials can be filled or not.

As can be seen more clearly in FIG. 3, the head 42 comprises four flat parts 420 extending radially from the central axis of the head 421, the so-called "axis of the shoe head". They are uniformly distributed about it, here at 90° from one another.

On the variant embodiment of FIG. 5, the head 42 comprises three flat parts 420, distributed at 120° to one another.

The head or heads 42 of the guide shoe 4 are intended to be received in a guide rail 5, which will now be described in more detail in connection with FIG. 6.

This guide rail 5 takes the form of a continuous profile of longitudinal axis X-X'. This guide rail 5 includes over its entire length a concave part 51, the central recess 52 of which opens onto an orifice 53. In cross section, this recess 52 has the shape of a "C". The recess 52 is therefore cylindrical with the axis X-X' and the orifice 53 forms a longitudinal slot.

This guide rail 5 is also preferably provided with at least one attaching member, preferably two, for example for attaching to longitudinal tabs 54, 55 which extend the entire length of the guide rail 5.

Preferably, these tabs extend from the bottom area of the recess 52, i.e. the area located opposite the orifice 53. They are for example located at right angles or substantially at right angles to one another.

These tabs 54 and 55 are shaped and dimensioned so as to be respectively received in the grooves 2640 and 2650 of the support profiles 264 and 265 respectively, as can be seen more clearly in FIG. 3.

Furthermore, when the guide rail 5 is mounted in these profiles 264, 265, the orifice 53 opens in the direction of the opening 27 of the front door.

The head or heads 42 of the guide shoe 4 are engaged in the concave part, i.e. in the recess 52 of the rail 5, so that the pillar 41 passes through the orifice 53 (see FIG. 3). Thus, whatever the position of the window 28, it is always guided in relation to the upright 23 and therefore to the frame 21. During assembly the head 42 of the shoe is introduced into the recess 52 by one of the ends of the rail 5.

Advantageously, this guide rail 5 comprises an inner coating 56, which lines the inner wall of the recess 52. This coating 56 and the guide rail 5 are made of two plastic materials, flexible, preferably of different natures. The material forming the inner coating 56 is a material with a low frictional coefficient that promotes the sliding of the shoe 4. It is for example polytetrafluoroethylene PTFE.

Advantageously, the material forming the guide rail 5 is chosen from among a rubber elastomer and/or thermoplastic elastomer material. Still preferably, this material is chosen from among a graphite-based composite, a molybdenum disulfide-based composite, polyacetal, polyamide, polytetrafluoroethylene PTFE, ultra-high-molecular-weight polyethylene, polypropylene or a polyolefin. These materials can be filled or not.

It should be noted that in certain cases, the material forming the rail 5 and the guide shoe 4 can be the same. The rigid behavior of the shoe and the elastically deformable behavior of the rail 5 are then related to the shape of these elements.

Advantageously, the guide rail 5 and its coating 56 are co-extruded. They can also be molded or bi-injected, or even single-material extruded when they are made of the same material. This makes it possible to produce large quantities of guide rails 5, which are then cut to the desired length at the time of their insertion into the upright 23. The production cost is thereby reduced.

The material forming the guide rail 5 (including its coating 56 if it is present) being flexible, i.e. elastically deformable, this rail can be mounted by inserting the tabs 54 and 55 respectively, into the grooves 2640 and 2650 respectively, by deformation and by force-fitting. In addition, this rail which is produced in the form of a straight profile is flexible enough in its height to follow the different curves of the door upright along the following directions: longitudinal along x, transverse along y and along the vehicle height z, thus permitting twisting. This rail 5 can also be adapted to the manufacturing tolerances of these uprights.

Moreover, the choice of the material of the guide rail 5 (including its coating 56) combined with its C-shaped section mean that this rail is constantly surrounding the guiding head 42. Thus, the free ends 422 of the flat parts 420 are constantly bearing against the inner wall of the recess 42. This makes it possible to hold the head 42 (and therefore the guide shoe 4) along the x and y axes to obtain static determinacy (isostatism) of the shoe.

The rail 5 is also flexible enough to ensure the sliding of the shoe 4 in all tolerance cases while permitting flush mounting. Thus, the gap between the plane P1 of the outer face of the window 28 and the plane P2 of the outer face of the surface-mounted part 261a (or more generally of the upright 23) is less than 1 mm. (In FIG. 3, this gap is zero).

The window 28 is also guided along the front upright 22. This guiding will now be described in more detail with reference to FIG. 4.

The front upright 22 comprises the inner structural profile 251 and the median structural profile 252 which are part of the surround 25 and a surface-mounted part 261b.

A window seal 266 is attached to the rear rim of the surface-mounted part 261b and comprises a longitudinal lip 2660 intended to bear in an airtight manner on the vertical edge of the window 28.

A seal of the window 267 is attached to the end oriented toward the rear of the structural profiles 251 and 252. It has a lip 2670 intended to slide against the inner surface of the window 28.

A support profile 29 is attached, for example by screwing, to the median structural profile 252.

This support profile 29 has a first longitudinal groove 291 and a second longitudinal groove 292.

The first groove 291 is shaped so as to extend substantially along the longitudinal axis of the vehicle and to open toward the front of it.

The second groove 292 has an "L"-shaped cross-section. It extends transversally with respect to the vehicle and opens toward the rear of it.

At least one guide shoe 6 is attached to the inner face of the window 28. This guide shoe 6 comprises a bearing plate 60 intended to be attached, for example by bonding, to the inner face of the window 28. This bearing plate 60 is extended by a pillar 61, which is itself extended by a free end forming a head 62. This head 62 here has a cross-section in the shape of a "U" with short branches.

The head 62 of the guide shoe 6 is received in a guide rail 7, which will now be described in more detail, in connection with FIG. 7.

In a similar way to what has already been described for the guide rail 5, the rail 7 takes the shape of a continuous profile of longitudinal axis X1-X'1. It comprises a concave part 71, the longitudinal recess 72 of which opens onto an orifice 73 which extends the entire length of said rail.

The head 62 of the guide shoe 6 slides inside the recess 72.

The rail 7 comprises at least one member (here two) for attaching to the support profile 29, for example in the form of two longitudinal tabs 74, 75, which extend the entire length of this guide rail. The recess 72 has a "U"-shaped cross-section.

The tab 75 extends in the continuation of one of the branches of the "U" forming the recess 72. The "L"-shaped tab 74 extends from the bottom of the recess 72, i.e. an area of the profile located opposite the longitudinal opening 73.

The tabs 74 and 75 are dimensioned and shaped so as to be respectively received in the second groove 292 and the first groove 291 of the support profile 29.

When this guide rail 7 is inserted into the front upright 22, it is arranged so that the recess 72 opens in the direction of the opening 27 of the door.

On the inner wall of the recess 72 provision is made for an inner coating 76 with a low frictional coefficient.

The materials forming the rail 7 and the coating 76 are chosen from among the same materials as those respectively forming the rail 5 and the coating 56.

The rail 7 and its coating 76 are advantageously co-extruded or molded or bi-injected or single-material molded.

The guide rail 7 and the guide shoe 6 are dimensioned and positioned so that, when the rail 7 is in the upright 22, the gap between the plane P1 of the outer face of the window 28 and the plane P3 of the outer face of the surface-mounted part 261b (or more generally of the upright 23) is less than 1 mm. (In FIG. 4, this gap is zero). An additional advantage of the invention appears in FIG. 9. The mounting of the window 28 in the uprights 22 and 23 using the guide rail 5 compliant with the invention and a rail such as the front rail 7 makes it possible to position the window 28 in the flush position, as mentioned previously. Hence the window 28 is also then flush with the crossbar 24.

In FIG. 9, the position of the crossbar 24 according to the prior art can be seen in dotted lines, without the use of the guide rails 5 and 7.

The position of the crossbar 24 with the new manner of mounting can be seen in solid lines.

Thus, according to the prior art, the distance between the outer face of the window 23 and the outer surface of the crossbar 24 had a value d1. This distance now has a value d2 less than d1.

The guiding of the window 38 of the rear door 3 will not be described in more detail. It is made by using for the front upright 32: the guide rail 5, described previously and which was mounted in the rear upright 23 and for the rear upright 33: for example, the guide rail 7, described previously and which was mounted in the front upright 22.

The invention claimed is:

1. A guiding device for guiding a sliding window in a glazed door with a flush window of a motor vehicle, the door comprising a panel extended by a frame, the frame and the panel together delimiting an opening inside which the window slides, the guiding device comprising:
   a guide rail configured to be inserted and retained in one of a front upright and a rear upright of the frame of the door, the guide rail having a profile, provided with a cylindrical longitudinal recess opening onto a longitudinal slot, which extends an entire length of the rail,
   and at least one guide shoe configured to be attached to an inner face of the sliding window, the guide shoe comprising at least one guiding head engaged in the cylindrical longitudinal recess through the longitudinal slot,
   wherein the guide shoe is rigid,
   wherein the guiding head of the guide shoe comprises at least three flat parts extending radially from a central axis of the guiding head, while being evenly distributed about the guiding head, the entire length of each flat part extending radially about the guiding head,
   and wherein the guide rail comprises a flexible and elastically deformable elastomer material, which surrounds the guiding head, so that a free end of each flat part of the guiding head are constantly bearing against an inner wall of the cylindrical longitudinal recess opening to hold the guiding head while permitting the axial sliding of the guiding head in the guide rail and which allows the mounting of the guide rail on a curved part of the door frame.

2. The guiding device as claimed in claim 1, wherein the guide rail comprises a rubber elastomer and/or thermoplastic elastomer material.

3. The guiding device as claimed in claim 2, wherein the guide rail comprises a material chosen from among a graphite-based composite, a molybdenum disulfide-based composite, ethylene propylene diene monomer EPDM, polyacetal, polyamide, polytetrafluoroethylene PTFE, ultra-high-molecular-weight polyethylene, polypropylene or a polyolefin.

4. The guiding device as claimed in claim 1, wherein the guide shoe comprises a thermoplastic elastomer material.

5. The guiding device as claimed in claim 4, wherein the guide shoe comprises a material chosen from among a graphite-based composite, a molybdenum disulfide-based composite, polyacetal, polyamide, polytetrafluoroethylene PTFE, ultra-high-molecular-weight polyethylene, polypropylene or a polyolefin.

6. The guiding device as claimed in claim 1, wherein the inner wall of the cylindrical longitudinal recess opening of the guide rail is covered with an inner coating with a low frictional coefficient promoting sliding.

7. The guiding device as claimed in claim 6, wherein the guide rail and the inner coating of the guide rail are co-extruded.

8. The guiding device as claimed in claim 1, wherein the guide shoe comprises two guiding heads coaxial along a central axis of the guiding head.

9. The guiding device as claimed in claim 8, wherein each guiding head is of ovoid shape, with a major axis corresponding to the central axis of the guiding-head.

10. The guiding device as claimed in claim 8, wherein the flat parts of one of the two guiding heads are angularly offset with respect to the flat parts of the other of the two guiding heads.

11. The guiding device as claimed in claim 1, wherein the guide rail comprises at least one member for attaching to one of the two uprights, the member being shaped to be able to be received in a longitudinal groove of one of the two uprights of the door frame.

12. A glazed door with a flush window of a motor vehicle, comprising:
  a panel which is extended by a frame, the frame including a front upright and a rear upright mutually connected by a crossbar, the frame and the panel together delimiting an opening,
  a sliding window, movable between a closed position wherein the sliding window completely shuts the opening and an open position wherein the sliding window is at least partly engaged in the panel and at least partly clears the opening,
  wherein the glazed door comprises a guiding device for guiding the sliding window, the guiding device comprising:
  a guide rail inserted and retained in one of the front upright and the rear upright of the frame of the door, the guide rail having a profile, provided with a cylindrical longitudinal recess opening onto a longitudinal slot, which extends an entire length of the rail, the guide rail being mounted in one of the front upright and the rear upright so that the longitudinal slot opens in a direction of the opening,
  and at least one guide shoe attached to an inner face of the sliding window, the guide shoe comprising at least one guiding head engaged in the cylindrical longitudinal recess opening through the longitudinal slot,
  wherein the guide shoe is rigid,
  wherein the guiding head of the guide shoe comprises at least three flat parts extending radially from a central axis of the guiding head, while being evenly distributed about the guiding head, the entire length of each flat part extending radially about the guiding head,
  and wherein the guide rail comprises a flexible and elastically deformable elastomer material, which surrounds the guiding head, so that a free end of each flat part of the guiding head are is constantly bearing against an inner wall of the cylindrical longitudinal recess opening to hold the guide shoe while permitting the axial sliding of the guide shoe in the guide rail and which allows the mounting of the guide rail on a curved part of the door frame
  and wherein the rail and the shoe are dimensioned and positioned so that the window is flush.

13. The glazed door as claimed in claim 12, wherein the glazed door is a front vehicle door and wherein the guide rail is attached to the rear upright of the frame.

14. The glazed door as claimed in claim 12, wherein the glazed door is a rear vehicle door and wherein the guide rail is attached to the front upright of the frame.

15. A motor vehicle, comprising at least one glazed door with a flush window as claimed in claim 12.

16. The guiding device as claimed in claim 1, wherein the guiding head of the guide shoe comprises four flat parts extending radially from the guiding head.

17. The guiding device as claimed in claim 11, wherein the member of the guide rail for attaching to one of the two uprights is a longitudinal tab extending an entire length of the guide rail.

* * * * *